W. E. NELSON.
MOLDING APPARATUS.
APPLICATION FILED AUG. 19, 1920.
1,433,905.
Patented Oct. 31, 1922.
3 SHEETS—SHEET 1.
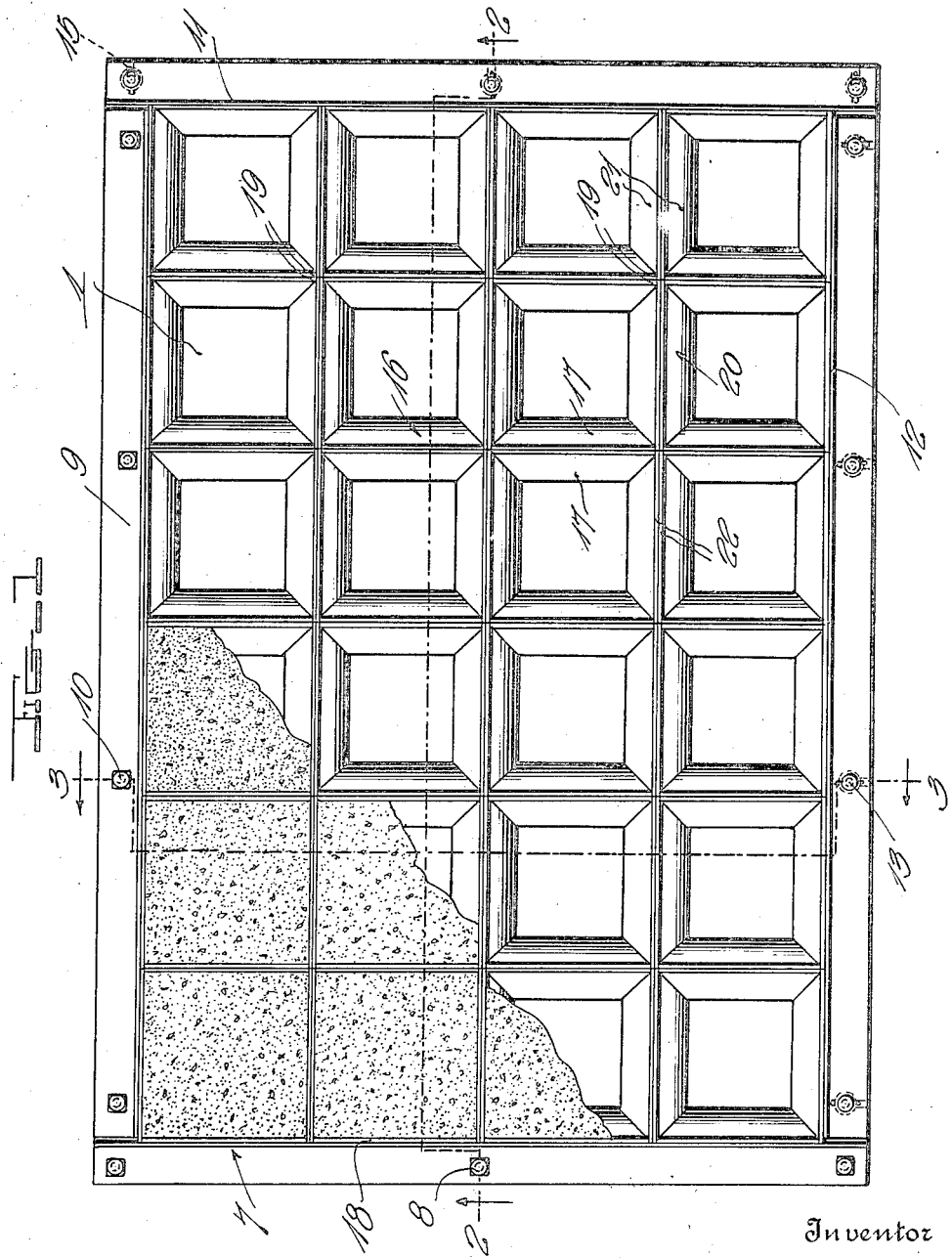
Inventor
W. E. Nelson
By H. B. Willson & Co.
Attorneys

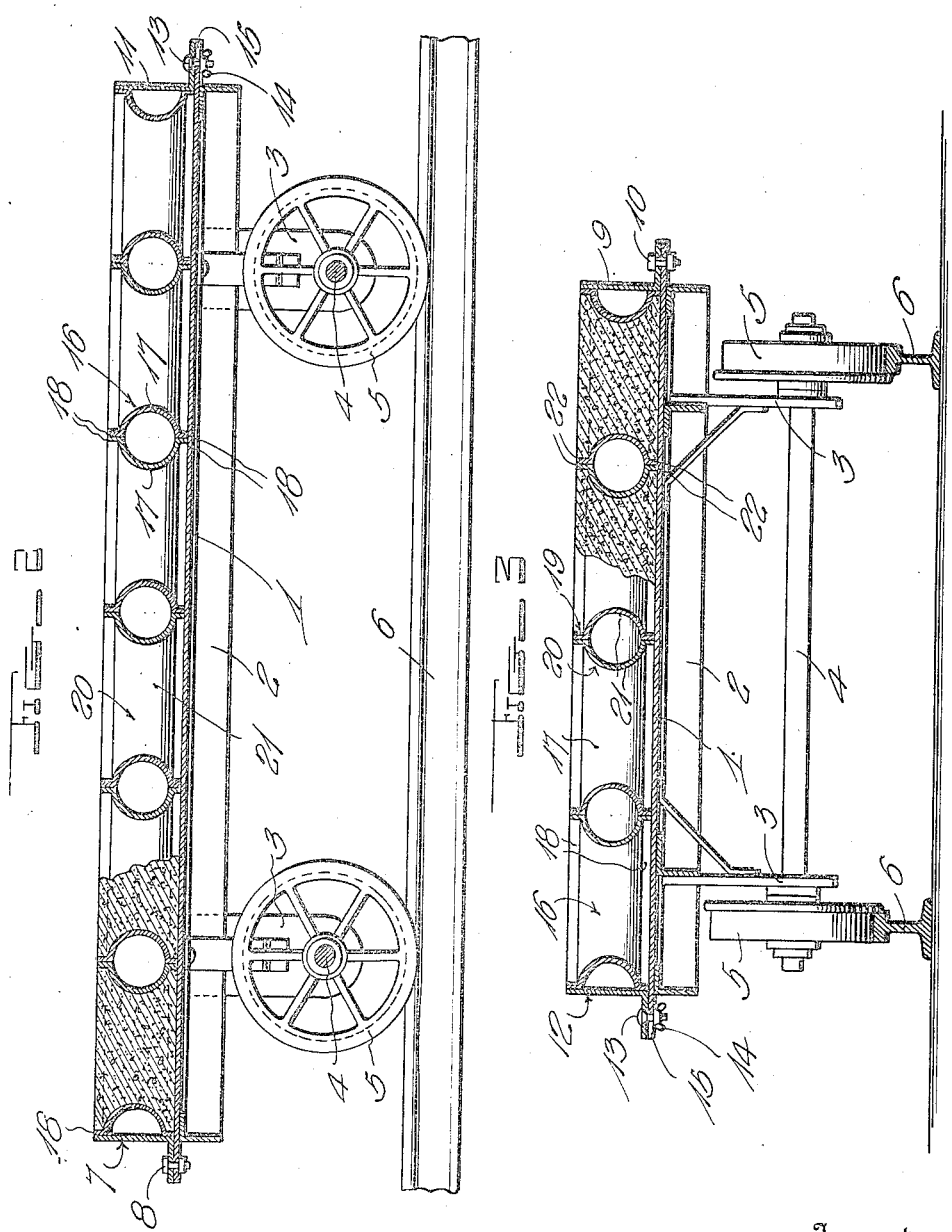

W. E. NELSON.
MOLDING APPARATUS.
APPLICATION FILED AUG. 19, 1920.
1,433,905.
Patented Oct. 31, 1922.
3 SHEETS—SHEET 3.
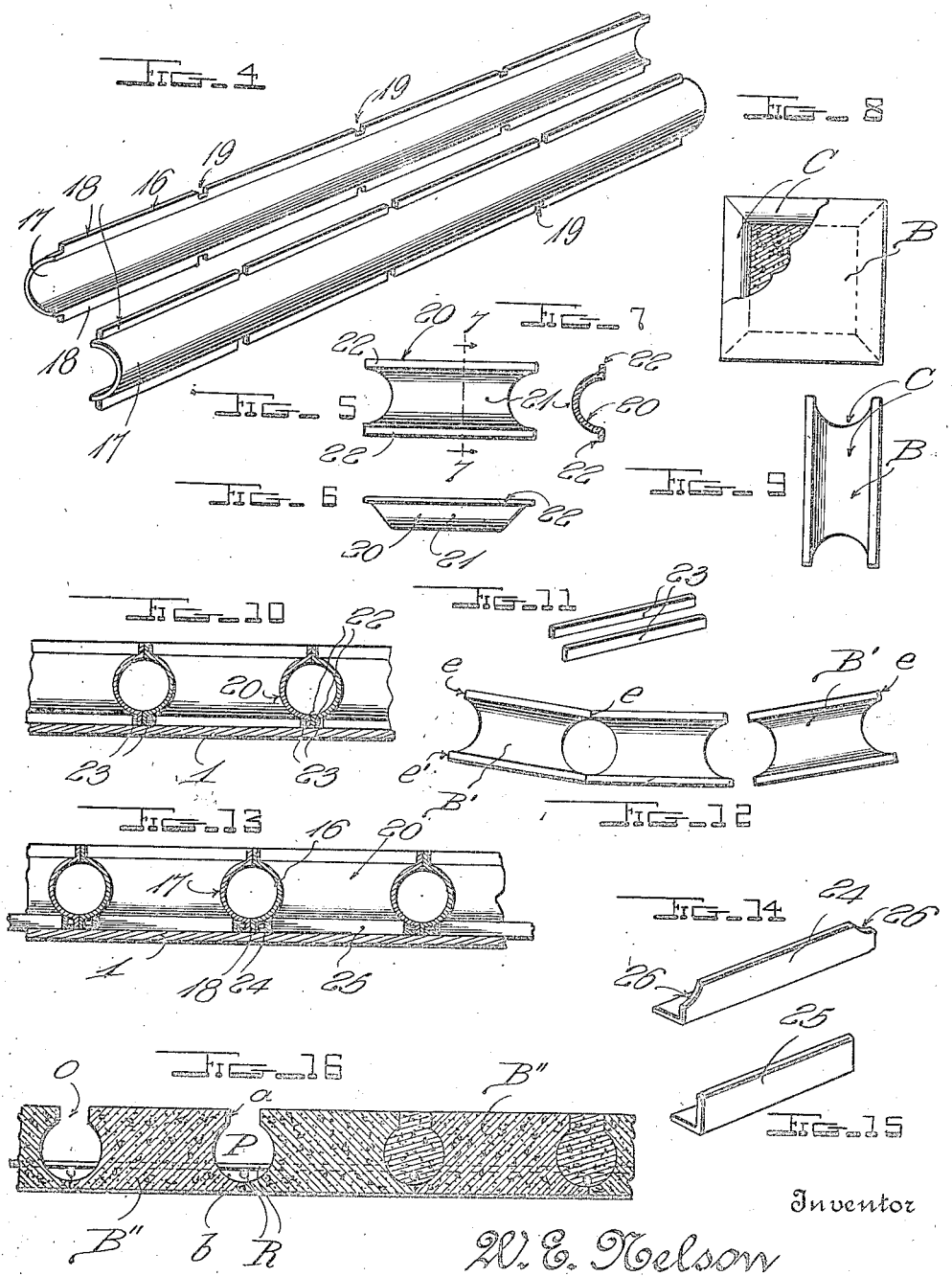

Patented Oct. 31, 1922.

1,433,905

UNITED STATES PATENT OFFICE.

WILLIAM E. NELSON, OF SAN ANTONIO, TEXAS.

MOLDING APPARATUS.

Application filed August 19, 1920. Serial No. 404,520.

*To all whom it may concern:*

Be it known that I, WILLIAM E. NELSON, a citizen of the United States, residing at San Antonio, in the county of Bexar and State of Texas, have invented certain new and useful Improvements in Molding Apparatus; and I do declare the following to be a full, clear, and exact description of the invention, such as will enable others skilled in the art to which it appertains to make and use the same.

This invention relates generally to molding apparatus, and particularly to molds for forming precast concrete units used for constructing monolithic straight and curved walls, floors, ceilings and other building structures.

One object of the invention is to form a mold in which a plurality of units may be molded simultaneously, the mold being so constructed that the various parts may be quickly and easily assembled and disassembled, the latter operation being necessary when removing the hardened units from it.

Another object of the invention is to provide a mold of this character with means whereby it may be moved from one position to another, thus simplifying the process of forming the units.

A further object of the invention is to provide a mold especially designed for making units adapted to be used in constructing straight walls, but provided with detachable parts whereby the mold is modified in order to adapt it for making units to be used in constructing curved walls, floors or the like.

With the above and other objects in view, the invention consists of the novel features of construction, and the combination and arrangement of parts as are hereinafter fully described and claimed.

The descriptive matter of the application is supplemented by the accompanying drawings forming a part thereof and in which:

Figure 1 is a plan view of a mold constructed in accordance with the invention, a few of the units formed by the mold being shown in the mold;

Fig. 2 is a longitudinal sectional view of the mold taken substantially on the line 2—2 of Fig. 1;

Fig. 3 is a transverse sectional view of the mold taken substantially on the line 3—3 of Fig. 1;

Fig. 4 is a perspective view of a pair of cooperating or complemental mold elements;

Fig. 5 is a side elevation of another form of mold element;

Fig. 6 is an edge view of this other form of mold element;

Fig. 7 is a transverse sectional view taken on the line 7—7 of Fig. 5;

Fig. 8 is a front view, partly broken away and in section, of the type of unit formed in the mold and adapted to be used for constructing straight walls;

Fig. 9 is an edge view of this form of unit;

Fig. 10 is a transverse sectional view of a portion of the mold, illustrating the manner in which detachable filler members are used in adapting the mold to form units used for constructing curved walls;

Fig. 11 is a perspective view of a pair of detachable filler members;

Fig. 12 is a plan or edge view of several curved wall units formed in the mold by using the filler members shown in Fig. 11;

Fig. 13 is a transverse sectional view of a portion of the mold, illustrating the manner in which additional detachable filler members are used when making units designed for floors or the like;

Fig. 14 is a perspective view of one of the last mentioned filler members;

Fig. 15 is a similar view of another of the last mentioned filler members; and

Fig. 16 is a transverse sectional view of a portion of a floor, constructed of units made in the mold when using the filler members shown in Figs. 14 and 15.

In the embodiment illustrated the numeral 1 designates the bottom of the mold, which is preferably in the form of a large flat rectangular shaped sheet metal plate reinforced at its lower side adjacent its four edges with structural angles 2 and having depending from its lower side adjacent its ends, pairs of standards 3 provided at their lower end with bearings in which the axles 4 of wheels 5 are mounted. The mold is thus mounted on a carriage so that it may be easily moved from one position to another, the wheels 5 preferably running upon rails 6.

Arranged at one end edge of the bottom 1 is an upright ledge 7, which is preferably in the form of a structural angle bar. This angle bar has one of its sides resting flat upon the bottom 1 and permanently secured thereto by means of bolts 8.

One of the side or longitudinal edges of the bottom 1 is similarly provided with an upright ledge 9 formed of a structural angle bar having one of its sides resting flat upon the bottom 1 and permanently secured by means of bolts 10.

The other end edge and other side or longitudinal edge of the bottom 1 are provided with upright ledges 11 and 12 respectively, which, like the ledges 7 and 9 are in the form of angle bars, but these ledges 11 and 12 are not permanently secured to the bottom 1. They are detachably fastened to the bottom. The means for doing this consists of bolts 13 carried by the ledges and provided on their free ends with wing nuts 14. The bolts 13 extend through slots 15 formed in the last mentioned edges of the bottom 1. By this construction the ledges 11 and 12 may be disconnected and removed from the bottom 1 by loosening the nuts 14 so as to allow the ledges to be removed, the bolts 13 sliding out of the slots 15 which permits this to be done.

The bottom or platform 1 and the ledges 7, 9, 11 and 12 constitute a rectangular-shaped support for a rectangular-shaped set of interlocked mold members. This set includes spaced parallel mold members which extend transversely across the support between the ledges 9 and 12 and which rest upon the bottom 1. These members consist of long sheet metal bars 16 which are bent circularly in cross section and have their edges flat and in alinement with one another so that they are provided with longitudinal bulges 17 on one of their sides and disposed between the upper and lower edges thereof. The flanges 18, or the upper and lower edges of the bars 16 are provided with notches 19, the purpose of which is hereinafter described. One of these bars 16 is positioned alongside the ledge 7 with its flanges 18 bearing flat against the inner side of the ledge. Another of the bars 16 is similarly positioned alongside of the ledge 11. The bulges 17 of these two bars 16 are disposed and extend inwardly. Between the ends of the support a number of intermediate mold members are disposed. Each of these intermediate mold members is constructed from a pair of the bars 16. Arranged so that the flanges 18 of one bar bears flat against those of the other bar and so that the bulges 17 extend in opposite directions. One of the bars 16 is thus the complement of the other bar 16 to form the complete mold member.

In order to divide the mold transversely a number of longitudinally extending spaced parallel mold members are used. These longitudinal mold members are constructed somewhat similar to the transverse members, but different therefrom principally because they are considerably shorter. One of these longitudinally extending mold members is shown in Figs. 5, 6 and 7 and from these views it will be seen that it consists of a bar 20 provided with a longitudinally extending bulged portion 21 and has its upper and lower edges flat and alined with one another so as to form flanges 22. As clearly shown in Fig. 6, the ends of the bar 20 are cut off obliquely. A number of the bars 20 are placed alongside the ledges 9 and 12 with their flanges 22 resting flat against the ledges and with their bulges 21 extending inwardly. The intermediate longitudinally extending mold members are formed of two of the bars 20 positioned so that the flanges 22 of one bar rest flat against those of the other bar and so that the bulges 21 extend in opposite directions. The projecting ends of the flanges 22 extend into the notches 19 formed in the bars 16 so that the bars 20 are locked relatively to the bars 16. The purpose of having the ends of the bars 20 cut off obliquely is to allow them to fit against or properly receive the bulges 17 of the bars 16.

In setting up the mold, assuming that the ledges 11 and 12 have been disconnected from the notches in the bottom 1 and that none of the mold members are in place upon the bottom, one of the bars 16 is first placed along the ledge 7. A number of the bars 20 are then placed at right angles to this first bar 16 with their ends interlocked therewith, one of the outermost bars 20 being placed alongside the ledge 9. The intermediate mold members are each formed of two bars 20. After the first series of bars 20 are in place, the next transverse mold member is put in place, and the assembling is carried out in a similar manner through the entire length of the mold. After this has been done, the ledges 11 and 12 are placed upon the bottom 1, and locked thereto by means of the bolts 13 and wing-nuts 14, the bolts 13 being slid into the notches 15 as the ledges 11 and 12 are moved to their proper position.

With a complete mold assembled, concrete is placed therein, leveled flush with the upper edges of the ledges and the various mold members by means of a trowel or in any other convenient manner, and the mold is then moved to a place where it may be allowed to stand for a time sufficient to permit the concrete to set. When it is desired to remove the hardened concrete units from the mold, the ledges 11 and 12 are removed and the mold members are also removed in order to free the units.

Figs. 8 and 9 represent the construction of one of the units formed by the means above described. From these views it will be seen that the units B are rectangular in shape and have semi-circular channels C around their edges, so that when the units are placed edge to edge circular passages are provided between them. A wall constructed of units of this character forms the subject-matter of pending application Serial No. 296,595, filed May 12, 1919.

By reference to Fig. 9 it will be seen that the units B are especially adapted for constructing straight walls in view of the fact that front and rear edges are cut off at right angles to their opposite faces. In order to adapt or modify the mold to be used for making units B' shown in Fig. 12 especially adapted for constructing circular walls filler members 23 shown in Fig. 11 are used. The units B' have their inner vertical edges e spaced inwardly from their outer vertical edges so that when the corresponding edges of several of the units are placed in abutting relation the structure formed will be curved. The filler members 23 are in the form of straight flat bars of a width substantially equal to the width of the flanges 22 of the bars 20. In use the filler members 23 are placed flat against the lower flanges 22 of the bars 20. A wall structure formed of units of the type shown in Fig. 12 forms the subject matter of application Serial No. 343,507, filed Dec. 9, 1919.

The units B and B' are adapted to be used for making walls and in doing so they are arranged in vertical and horizontal rows and cement is poured into various of the upright portions of the passages formed by the channels, and from these upright passages the cement flows into the horizontal passages. In view of the fact that cement will not flow except for short distances through horizontal passages, when it is desired to make units for use as floors or the like provision must be made to permit the horizontal passages to be properly filled. In Fig. 16 of the drawing a section of a floor constructed of units B'' is shown. From this view it will be seen that the upper edges a of the units B'' are spaced materially inwardly of the lower edges b. Not only two of the upper edges a of the units B'' are spaced inwardly from the lower edges b as is the case of the units B' but all of the edges of the units B'' are spaced inwardly of the edges b. This construction provides a network of openings o leading into the network of passages P formed when the units B'' are arranged on a flat surface and edge to edge so that reinforcing rods R may be placed in the passages B and cement may be poured therein and leveled off flush with the upper sides of the units.

In forming the units B'' filler members 24 and 25 are used. The filler members 24 consist of angle bars having the upper corners of the upright sides notched out as at 26. These bars 24 are arranged alongside of the bars 16 with their horizontal sides bearing against the lower flanges 18 thereof and with the upper edges of the upright sides bearing against the lower portions of the bulges 17. The notches 26 contact with the bulges 21 of the bars 20. The filler members 25 are in the form of angle bars and are arranged alongside the bars 20 in a manner similar to the manner in which the members 24 are arranged alongside the bars 16. These bars 25 are shorter than the bars 24 so that their ends will abut the upright sides of the bars 24.

From the foregoing description taken in connection with the accompanying drawings, it will be seen that the objects of the invention have been effectively carried out. The mold disclosed may be used for making units for either straight or curved walls or for floors or the like. It may be easily assembled and disassembled and may be moved from one place to another.

The construction herein shown and described is thought to be best suited for the purpose in mind, but since it may be modified from time to time as particular uses demand, it is to be understood that various changes in form, proportion, and in the minor details of construction may be resorted to without departing from the spirit and principle of the invention as defined in the appended claims.

What is claimed is:

1. A mold comprising a rectangular platform, upstanding ledges permanently fixed at two adjacent edges of said platform, additional upstanding ledges detachably fastened at the other two adjacent edges of said platform, mold members resting upon said platform and extending across the entire width thereof and confined between the ledges at the sides thereof, the members at the ends of said platform bearing against the ledges thereat and comprising bars provided with longitudinally extending bulges, the intermediate mold members comprising pairs of bars having oppositely extending longitudinal bulges, additional mold members extending longitudinally of said platform and confined between adjacent transverse mold members, the longitudinal mold members which are adjacent the ledges disposed at the sides of the platform bearing against these ledges and comprising short bars provided with longitudinal bulges on their inner sides, the intermediate longitudinal mold members comprising pairs of short bars provided with oppositely disposed bulges, the ends of the longitudinal mold members being interlocked with the transverse mold members.

2. A structure as specified in claim 1 and in addition thereto, the ends of the bars forming the longitudinal mold members being cut off obliquely to adapt them to fit around the bulges of the transverse mold members.

3. A structure as specified in claim 1 together with the bars forming the transverse mold members being provided with notches at their upper and lower edges to receive the upper and lower edges of the ends of the bars forming the longitudinal mold members.

4. A mold comprising a rectangular platform, upstanding ledges arranged at the four edges of said platform, longitudinally and transversely extending mold members resting upon said platform and confined between said ledges, said mold members being formed from bars provided with longitudinal bulges and flat flanges at their upper and lower edges, said flanges being alined, and filler members resting upon the platform and bearing against the flanges at the lower edges of said mold members.

5. In a multiple concrete unit-molding apparatus, a rectangular-shaped set of interlocked mold members for disposition in a rectangular-shaped support, said set comprising a plurality of relatively long members arranged in spaced parallel relation and a plurality of relatively short members arranged between and at right angles to the relatively long members and in spaced parallel relation, the outermost relatively long members and the outermost relatively short members being respectively in the form of relatively long and relatively short bars having flanges at their upper and lower edges and longitudinally extending bulges on their inner sides between their flanges, and the intermediate relatively long members and the intermediate relatively short members being respectively in the form of relatively long and relatively short pairs of bars arranged back to back and having flanges at their upper and lower edges and their remote sides provided with longitudinally extending bulges between their flanges, the flanges of the relatively long bars being provided with notches to receive the ends of the flanges of the relatively short bars.

In testimony whereof I have hereunto set my hand.

WILLIAM E. NELSON.